Dec. 22, 1959 R. K. LOWMAN 2,918,308
WEIGHT DISTRIBUTOR FOR DETACHABLE TRAILER HITCH
Filed June 16, 1958 2 Sheets-Sheet 1
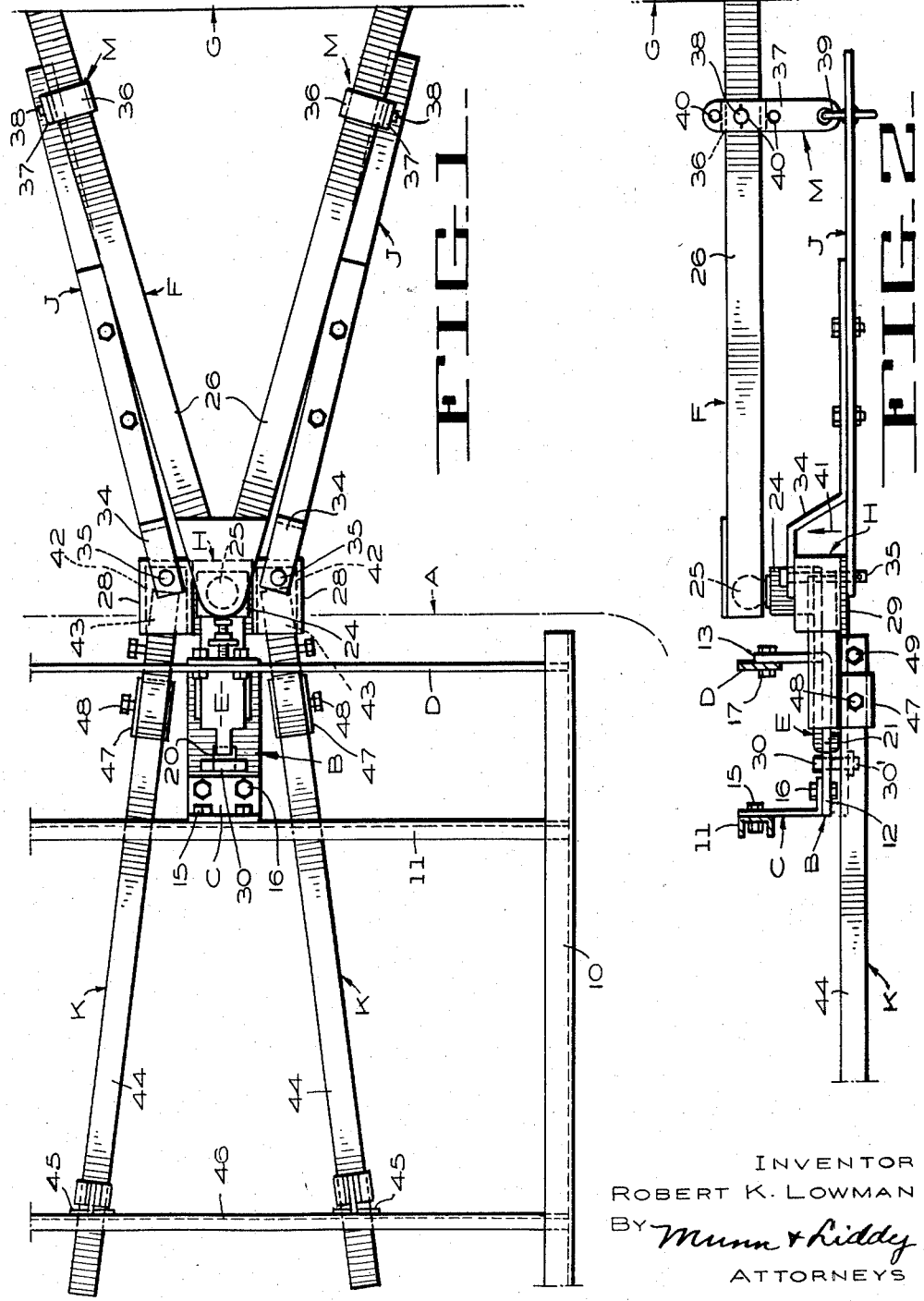
INVENTOR
ROBERT K. LOWMAN
BY Munn + Liddy
ATTORNEYS Dec. 22, 1959   R. K. LOWMAN   2,918,308
WEIGHT DISTRIBUTOR FOR DETACHABLE TRAILER HITCH
Filed June 16, 1958   2 Sheets-Sheet 2
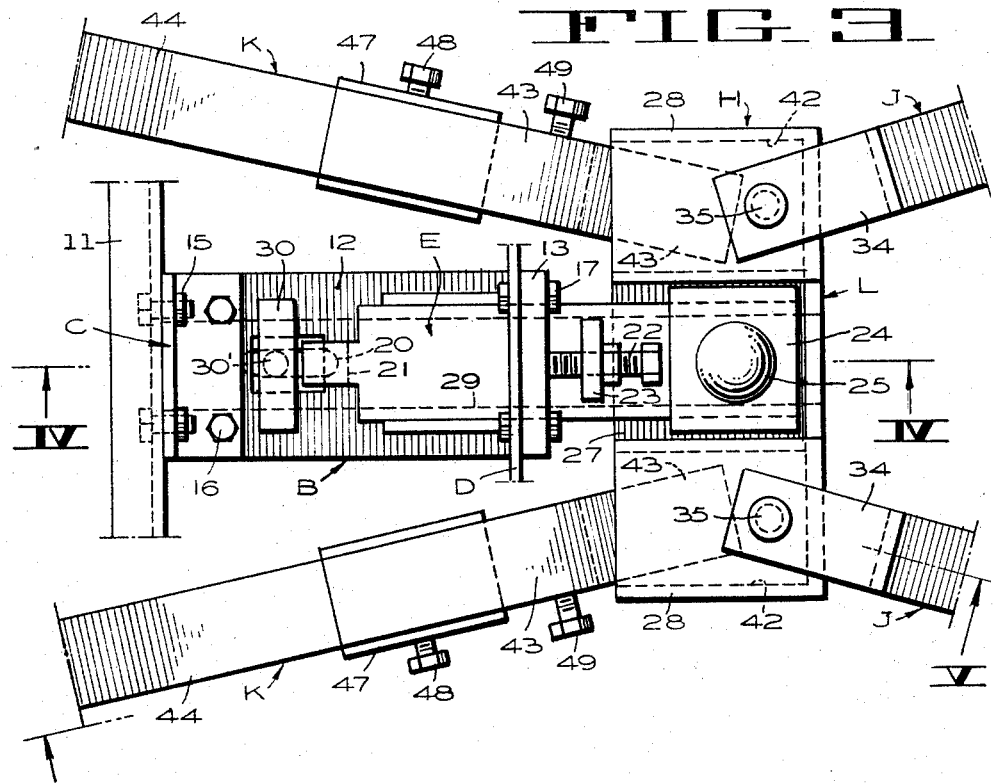
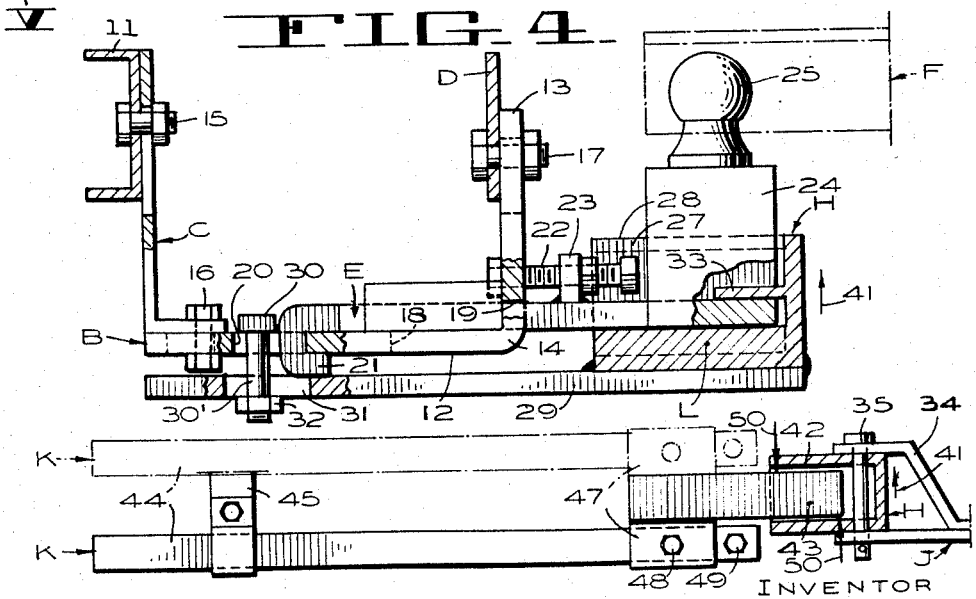
INVENTOR
ROBERT K. LOWMAN
BY Munn & Liddy
ATTORNEYS United States Patent Office 2,918,308
Patented Dec. 22, 1959

2,918,308

WEIGHT DISTRIBUTOR FOR DETACHABLE TRAILER HITCH

Robert Keith Lowman, Oroville, Calif.

Application June 16, 1958, Serial No. 742,146

4 Claims. (Cl. 280—406)

The present invention relates to improvements in a weight distributor for detachable trailer hitch. It consists of the combinations, constructions and arrangement of parts, as hereinafter described and claimed.

In my United States Letters Patent No. 2,622,892, issued December 23, 1952, there is shown a detachable trailer hitch, which is adapted to connect a trailer with a towing vehicle. The downward pressure created by the trailer exerts considerable force on the hitch, the weight increasing with the length of the trailer.

An object of this invention is to provide an adapter bracket for a weight distributor, which may be used in conjunction with my patented trailer hitch, the adapter bracket being made to have weight-transferring bars secured thereto so as to distribute part of the weight that normally falls on the trailer hitch to the forward portion of the chassis frame of the towing vehicle, thus relieving the trailer hitch of excess strain.

When the downward force of the trailer tongue on the trailer hitch will exceed a predetermined amount, when using the larger size of trailers, the weight-transferring bars are added so as to distribute part of the weight to the forward portion of the towing vehicle.

Other objects and advantages will appear as the specification continues. The novel features will be set forth in the claims hereunto annexed.

For a better understanding of the invention, reference should be had to the accompanying drawings, forming part of this application, in which:

Figure 1 is a fragmentary top plan view of a towing vehicle having a trailer coupled thereto by my detachable trailer hitch, and further showing my weight distributor;

Figure 2 is a side elevational view of Figure 1 with the chassis frame of the towing vehicle being omitted;

Figure 3 is an enlarged view of the central portion of Figure 1;

Figures 4 and 5 are longitudinal sectional views taken along the lines IV—IV and V—V, respectively, of Figure 3.

While I have shown only the preferred form of my invention, it should be understood that various changes, or modifications, may be made within the scope of the appended claims without departing from the spirit thereof.

*Detailed description*

Referring now to the drawings in detail, I have shown fragmentary portions of a towing vehicle indicated generally at A. This vehicle includes the usual chassis frame 10 at each side of the vehicle, which are interconnected by a transverse frame 11.

The trailer hitch shown in my United States Letters Patent No. 2,622,892, has been illustrated in Figures 1 to 4, inclusive. It provides a draw-bar B that is angle-shaped, defining horizontal and vertical legs 12 and 13, respectively, which define a junction 14 therebetween, as clearly disclosed in Figure 4. While this draw-bar is carried by the vehicle A, it is concealed from view.

For the purpose of supporting the draw-bar B on various sizes and types of vehicles, I make use of an angle bracket C. The latter is adjustably secured to the frame 11 and the draw-bar B by bolts 15 and 16, respectively. The rear portion of the draw-bar is supported on a transverse strip D, which has the vertical leg 13 adjustably anchored thereto by bolts 17. Moreover, the draw-bar B is fashioned with a slot 18 near its junction 14, as indicated in Figure 4, this slot extending into both the horizontal and vertical legs 12 and 13, respectively. The leg 13 defines a wall 19 at the top of the slot 18, while a hook-engaging opening 20 is provided in the leg 12 ahead of the junction slot 18 (see Figure 4).

The second principal component of my patented trailer hitch constitutes a removable draft-bar E having a hook 21 depending from its forward end, this hook being turned rearwardly. This draft-bar is adapted to be inserted through the draw-bar slot 18 so as to overlap the horizontal leg 12, as shown in Figure 4. The hook 21 may be lowered through the opening 20, and then the draft-bar E may be retracted a slight distance to engage the hook 21 with the draw-bar B. At this time, the wall 19 will bear against the upper surface of the draw-bar E, as illustrated in Figure 4.

In order to retract the removable draft-bar E relative to the draw-bar B, and maintain them in coupled relation, I make use of a bolt 22, which is threaded through a lug 23 fixed to the draft-bar E. This bolt has its forward end rotatably anchored to the vertical leg 13.

It will be noted that the draft-bar E is provided at its trailing end with an upstanding tongue-securing bracket 24, this bracket carrying a ball 25 at its top to which a hitch tongue F of a trailer G may be coupled in the usual manner. The tongue is provided with side members 26 which converge forwardly.

The parts of my detachable trailer hitch thus far set forth are shown in my Patent No. 2,622,892 mentioned earlier. The structural features of my weight distributor for the trailer hitch will now be described. It includes an adapter bracket H; a pair of spring torsion bars J; and a pair of weight-transferring bars K.

The adapter bracket H has a transverse member L provided with a central recess 27 which is arranged to receive the rear portion of the draft-bar E. This transverse member has end sections 28 disposed on opposite lateral sides of the rear portion of the draft-bar, as clearly shown in Figure 3. The adapter bracket H is provided with a supporting bar 29 which projects forwardly from the transverse member L, the bar 29 being disposed below the draft-bar E (see Figure 4). In order to removably secure the forward part of the supporting bar 29 to the draw-bar B, I have provided a T-shaped bolt 30, the shank 30' of this bolt extending downwardly through the opening 20 of the draw-bar B, as disclosed in Figure 4. Moreover, the shank 30' projects downwardly through a slot 31 fashioned in the forward part of the supporting bar 29. When a nut 32 is tightened on the lower end of the shank, the bar 29 will be secured in place below the draw-bar B.

It will be noted that the transverse member L of the adapter bracket H is provided with a lug 33 that is disposed to bear against the top surface of the draft-bar E to support the adapter bracket H when the latter is initially applied to the draft-bar. Transverse member L bears against the rear portion of the draft-bar E from below (see Figure 4).

As mentioned earlier, the weight distributor further includes the pair of spring torsion bars J. Each of these bars is fashioned with a clevis 34 at its forward end, which is swingably secured to one of the end sections 28 of the transverse member L for swinging about a vertical axis, the later being defined by a journal pin 35 which extends downwardly through a clevis 34 and one of the end sections 28. It will be apparent from Figures 1 and 3 that two of the journal pins 35 are provided, one for each of the torsion bars J.

Turning now to Figures 1 and 2, it will be seen that a pair of adjustable suspension members M are provided for interconnecting the rear portions of the spring torsion bars J with the side members 26 of the trailer or hitch tongue F. The members M define stirrups 36 which embrace the side members 26 of the tongue, these stirrups having links 37 adjustably secured thereto by pivot pins 38. The lower ends of the links 37 are swingably anchored to the spring torsion bars J by rings 39 (see Figure 2). Each of the links 37 is fashioned with a plurality of openings 40 therein. Obviously, the pivot pins 38 may be inserted through selected openings 40 to thus adjust the torsion bars J toward or away from the side members 26 of the draft tongue F.

When the hitch tongue F is initially coupled to the ball 25, the weight of the trailer G will cause the tongue F to be depressed so as to slope downwardly in a forward direction. But when the suspension members M are adjusted so as to raise the rear ends of the torsion bars J, the torsion bars will raise the transverse member L of the adapter bracket H, as suggested by the arrows 41 in Figures 2 and 4. Inasmuch as the member L bears against the rear portion of the draft-bar E, as shown in Figure 4, the tongue-securing bracket 24 and its ball 25 will be raised in a like manner. This will cause the tongue F to straighten out into a level position. At the same time, part of the weight of the trailer will be taken off the ball 25 and transmitted through the adapter bracket H, the draw-bar B and the draft-bar E to the chasis frame 10 of the towing vehicle A. This will raise the rear part of the towing vehicle slightly. Of course, as more tension is applied to the torsion bars J by adjusting the adjustable suspension members M, a greater proportion of the weight of the trailer G will be transmitted to the chassis frame of the towing vehicle A.

When the weight of the trailer load on the ball 25 exceeds a predetermined amount, for instance 400 pounds, the weight-transferring or tank bars K are employed so as to distribute the excess load to the forward part of the towing vehicle. It will be noted that the end sections 28 of the adapter bracket H are each provided with a socket 42 extending rearwardly thereinto from the forward face of the transverse member L. The rear end sections 43 of the weight-transferring bars K are adapted to be telescoped into the sockets 42. The forward sections 44 of the bars K are connected by brackets 45 to a transverse member 46, the latter being connected to the chassis frame ahead of my detachable trailer hitch (see Figure 1).

It will be apparent that when the rear portions of the adapter bracket H and the draft-bar E are raised in the direction of the arrows 41, the forward sections 44 of the bars K will pull downwardly on the brackets 45. This will tend to pull down on the chassis frame 10 at the front of the towing vehicle and relieve the ball 25 of part of the trailer load. Thus a portion of the trailer load is distributed by the bars K to the front part of the towing vehicle.

As shown in the drawings, the rear sections 43 of the weight-transferring or tank bars K have sleeves 47 welded thereto. The forward sections 44 of the bars K are telescoped through the sleeves 47, and the latter are provided with set-screws 48 for holding the forward sections 44 is adjusted position. Stop screws 49 are anchored to the sections 44 in back of the sleeves 47 to prevent the forward sections 44 of the bars K from being accidentally pulled out of the sleeves 47.

It will be appreciated, of course, that obstructions will be encountered when applying the weight-transferring bars K to the underneath part of the towing vehicle, for example, the gas tank. As shown in the solid lines in Figure 5, the forward sections 44 are arranged underneath the rear sections 43. However, the positions of these sections may be reversed, as suggested by the dot-dash lines in Figure 5, so that the sections 44 will be disposed above the sections 43. Moreover, it is obvious that the sections 43 and 44 could be arranged in the same plane. Thus various adjustments of the bars K may be made so as to clear any obstructions, and still the bars K will transmit weight from the trailer G to the forward part of the chassis frame 10 of the towing vehicle A.

The journal pins 35 and the pivot pins 38 will permit the towing vehicle A to turn laterally without any interference being offered by the torsion bars J, and at all times permitting the trailer tongue F to swing about the ball 25, as will be apparent from Figure 1 of the drawings.

Referring to Figure 5, when the adapter bracket H is raised, as suggested by the arrow 41, due to tensioning of the spring torsion bars J, the bracket H will contact with the rear sections 43 of the bars K at the points indicated by the arrows 50, thus causing the bars K to pull down on the brackets 45.

I claim:

1. In combination with a detachable trailer hitch which comprises a draw-bar secured to a towing vehicle and a draft-bar to which a trailer tongue may be coupled; the draft-bar being removably secured to the draw-bar; an adapter bracket for a weight distributor; the adapter bracket having a transverse member elongated in a horizontal direction and defining end sections disposed on opposite lateral sides of the rear portion of the draft-bar; the adapter bracket being provided with a horizontal supporting bar which projects forwardly from the transverse member; the supporting bar being disposed below the draft-bar, and being removably secured to the draw-bar; the transverse member bearing against the rear portion of the draft-bar from below; each of the end sections of the transverse member of the adapter bracket being provided with a socket extending rearwardly thereinto from a forward face of the transverse member; each socket being disposed and dimensioned to have the rear end section of a weight-transferring bar removably telescoped thereinto, with the weight-transferring bar extending generally lengthwise of the towing vehicle.

2. In combination with a detachable trailer hitch which comprises a draw-bar secured to a towing vehicle and a draft-bar to which a trailer tongue may be coupled; the draft-bar being removably secured to the draw-bar; an adapter bracket for a weight distributor; the adapter bracket having a transverse member elongated in a horizontal direction and defining end sections disposed on opposite lateral sides of the rear portion of the draft-bar; the adapter bracket being provided with a horizontal supporting bar which projects forwardly from the transverse member; the supporting bar being disposed below the draft-bar, and being removably secured to the draw-bar; the transverse member bearing against the rear portion of the draft-bar from below; each of the end sections of the transverse member being provided with means to which a bar of a weight distributor may be removably connected.

3. The combination as defined in claim 2; and in which the transverse member of the adapter bracket is provided with a central recess extending downwardly thereinto and being disposed to receive the rear portion of the draft-bar; said recess defining walls disposed adjacent to opposite lateral sides of the draft-bar in positions to hold the rear part of the bracket from shifting laterally relative to the draft-bar.

4. The combination as defined in claim 2; and in which the transverse member of the adapter bracket is provided with a forwardly-projecting horizontal lug disposed to bear against the top surface of the draft-bar to support the adapter bracket when the latter is applied to the draft-bar, with the lug supporting the weight of the adapter bracket while the latter is being secured to the drawbar.

References Cited in the file of this patent

UNITED STATES PATENTS

| | | |
|---|---|---|
| 2,622,892 | Lowman | Dec. 23, 1952 |
| 2,793,878 | Toland | May 28, 1957 |
| 2,817,542 | Wettstein | Dec. 24, 1957 |
| 2,828,143 | De Vatz | Mar. 25, 1958 |